US 6,580,708 B1

(12) United States Patent
Choi

(10) Patent No.: US 6,580,708 B1
(45) Date of Patent: Jun. 17, 2003

(54) METHOD OF MULTI-PROCESSING DATA IN ARCNET

(75) Inventor: Myoung Soo Choi, Suwon (KR)

(73) Assignee: Samsung Electronic Co., Ltd. (KR)

( * ) Notice: Subject to any disclaimer, the term of this patent is extended or adjusted under 35 U.S.C. 154(b) by 0 days.

(21) Appl. No.: 09/317,918

(22) Filed: May 25, 1999

(30) Foreign Application Priority Data

Oct. 2, 1998 (KR) ......................... 1998-41504

(51) Int. Cl.⁷ ................. H04L 12/28; G06F 13/14
(52) U.S. Cl. .................. 370/351; 709/228; 709/229; 709/232; 709/238; 709/319
(58) Field of Search ................ 370/351, 389; 709/232, 237, 238, 245, 249, 319, 321, 329, 228, 229

(56) References Cited

U.S. PATENT DOCUMENTS

| | | | | |
|---|---|---|---|---|
| 4,207,609 A | * | 6/1980 | Luiz et al. ............... | 710/38 |
| 5,249,184 A | * | 9/1993 | Woest et al. ............. | 370/402 |
| 5,590,288 A | * | 12/1996 | Castor et al. ............ | 709/201 |
| 6,058,414 A | * | 5/2000 | Manikundalam et al. ... | 709/104 |
| 6,058,423 A | * | 5/2000 | Factor .................... | 709/226 |
| 6,115,747 A | * | 9/2000 | Billings et al. .......... | 709/231 |
| 6,199,133 B1 | * | 3/2001 | Schnell .................. | 709/208 |
| 6,233,602 B1 | * | 5/2001 | Van Venrooy et al. .... | 709/203 |

* cited by examiner

Primary Examiner—Hassan Kizou
Assistant Examiner—Ahmed Elallam
(74) Attorney, Agent, or Firm—Burns, Doane, Swecker & Mathis, L.L.P.

(57) ABSTRACT

A method of multi-processing data in an attached resource computer network, includes a first step of setting a network address data MAP, which is a path for transmitting data to a plurality of stations and each processor employed in each station. The method further includes a second step of, when transmitting a data packet from a random station to a destination station, calling a transmission function by using an identification code corresponding to each address data in the network MAP, detecting the network MAP by the identification code to obtain the source process address and the destination station and the destination process address data, and inserting and transmitting into the data unit of the data packet. A third step of receiving the data packet transmitted from the second step is performed, and includes obtaining the address data from the data packet, detecting the network MAP set in the attached resource computer network entity, and thereby determining if there is the same address data for denoting the process of its own station. Further, a fourth step of transmitting data to the corresponding process if there is the same address data set in the network MAP of the attached resource computer network in the previous third step is performed.

3 Claims, 3 Drawing Sheets

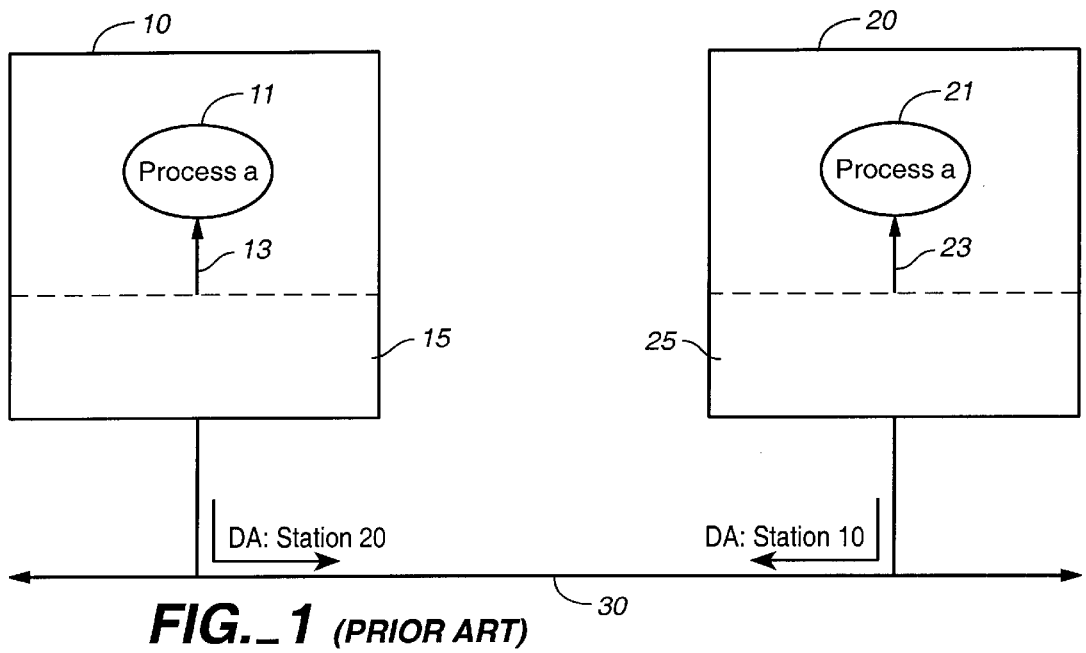
FIG._1 (PRIOR ART)
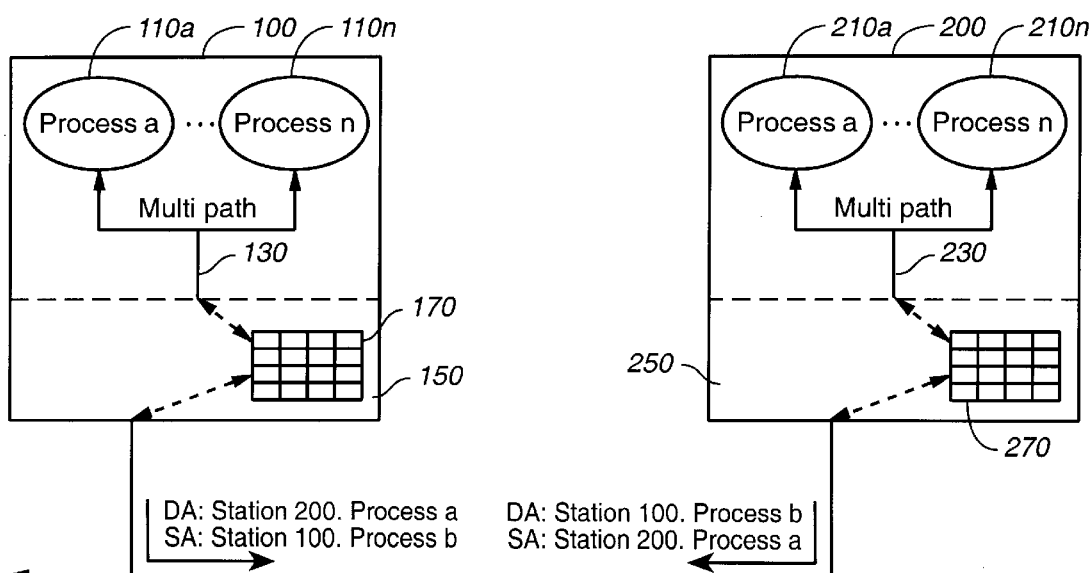
FIG._2

| IDENTIFICATION CODE | SOURCE PROCESS NAME | SOURCE SAP | DESTINATION STATION | DESTINATION SAP |
|---|---|---|---|---|
| 0 | Process a | 1000 | 100 | 3000 |
| 1 | Process a | 1000 | 200 | 3000 |
| 2 | Process b | 2000 | 100 | 3001 |
| 3 | Process b | 2000 | 200 | 3001 |
|  |  |  |  |  |

METHOD OF MULTI-PROCESSING DATA IN ARCNET

BACKGROUND OF THE INVENTION

1. Field of the Invention

The present invention relates to a communications system using ARCNET(Attached Resource Computer Network), and more particularly, to a data multi-processing method in ARCNET allowing ARCNET to support a plurality of internal network paths so as to operate a plurality of network processes in one station with a small number of network overheads.

2. Discussion of Related Art

Generally in data communications, data is passed between a plurality of stations which are coupled and the data information is transmitted to or received from other stations according to data processing of internet processes.

Such kind of station relies on a communications protocol in exchanging information with other stations, and its network is configured with OSI (Open System Interconnection) seven-layer model in which several necessary communications functions are classified into several layers, and each layer's function is defined to thereby exchange data between processes in other systems.

For a basic component of the station network, there are open systems (for example, station, computer or terminals) for managing between applied processes each performing data exchanging, physical transmitting media for connecting between open systems, and a connector for connecting between the applied processes.

Among the seven layers, layer 1 and layer 2 are about functions and norms of hardware; and layer 3 to layer 7 define functions and norms of software. ARCNET is a data link belonging to the layer 2 in OSI seven layers, playing a role of transmitting data correctly to the other station without data error in data packet.

Presently, there is a tendency to classify network into units according to the open system architecture, each performing its own function and thereby being an additional process. Accordingly, a network which connects between stations with a plurality of processes should support a plurality of internal network paths to thereby classify processes in one station.

The communications system using a conventional ARCNET, as illustrated in FIG. 1, includes a plurality of stations 10 and 20, processors in each station 11 and 21, connectors for connecting processors 13 and 23, ARCNET entities 15 and 25 which are data line layers, and physical medium 30 which is data line.

If messages are transmitted from a random station 10 to the other station 20, a destination address (DA:Destination Address) of the ARCNET entity designates only the address of the other station, not transmitting the address of the random processors 11 or 21 in the station, and the conventional ARCNET only supports the single network path.

That is, there is a single path in the connectors 13 and 23 between the processors 11 and 21 and ARCNET entities 15 and 25, and also in the physical medium 30 between the source station 10 and arriving station 20.

Therefore, the communication systems using the conventional ARCNET cannot operate in a multi-processing mode using a plurality of internal processors, and their processing times for a predetermined amount of data therefore cannot be appreciably reduced.

SUMMARY OF THE INVENTION

Accordingly, the present invention is directed to a method of multi-processing data in ARCNET that substantially obviates one or more of the problems due to limitations and disadvantages of the related art.

An object of the present invention is to provide a method of multi-processing data in ARCNET, allowing the entity to support a plurality of internal network paths to thereby operate a plurality of network processors simultaneously.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of multi-processing data in attached resource computer network, includes the steps of:

a first step of, in the attached resource computer network, setting the network address data MAP which is a path for transmitting data to a plurality of stations and each processor employed in each station;

a second step of, when transmitting data packet from a random station to a destination station, calling a transmission function by using an identification code corresponding to each address data in the network MAP, detecting the network MAP by the identification code to obtain the source process address and the destination station and the destination process address data, and inserting and transmitting into the data unit of the data packet;

a third step of receiving the data packet transmitted from the second step, obtaining the address data from the data packet, detecting the network MAP set in the attached resource computer network entity, and thereby determining if there is the same address data for denoting the process of its own station; and a fourth step of transmitting data to the corresponding process if there is the same address data set in the network MAP of the attached resource computer network in the previous third step.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a diagram showing the structure of a communication system using a conventional ARCNET;

FIG. 2 is a diagram showing the structure of a communication system using ARCNET of the invention;

DETAILED DESCRIPTION OF PREFERRED EMBODIMENT

Figures 3, 4:
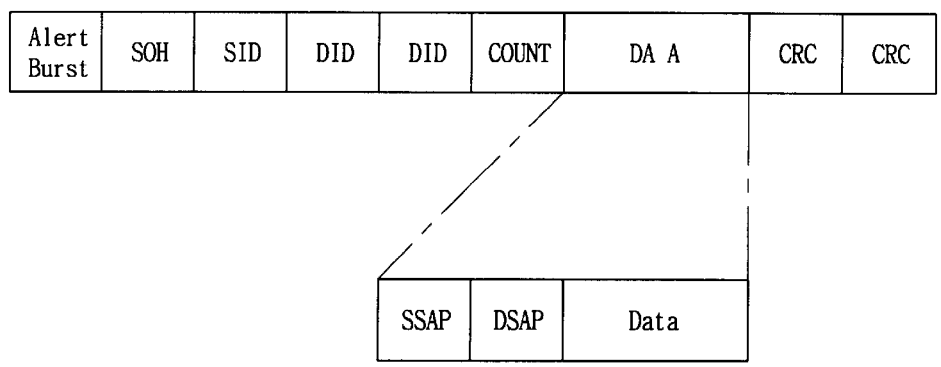
FIG. 3 is a network path MAP set to the ARCNET entity of the invention.
FIG. 4 shows the structure of a data packet of the invention.

Reference will now be made in detail to the preferred embodiments of the present invention, examples of which are illustrated in the accompanying drawings.

FIG. 2 is an ARCNET system applied to the present invention, including a plurality of stations 100 and 200, processors in each station 110a to 110n and 210a to 210n, connectors 130 and 230 for connecting the processors, ARCNET entities of data link layer 150 and 250 and a physical medium of data line 300.

Also provided are MAPS 170, 270 for designating network paths in the ARCNET entities 150, and 250 and all data packet transmitted/received to each station 100 and 200 decide network transmission path through the network path MAP of the ARCNET entities 150 and 250.

When transmitting data from a random station 100 to the other station 200, the source station 100 of the data packet should upload the DA and processor address on the transmission data packet to thereby enable the destination station 200 to decide the network path. The ARCNET entity 250 of the destination station 200 compares the processor address uploaded onto the transmission data packet with the address information set by the network path MAP 270 and transmits the data packet to the selected processor 210a to 210n through a certain path.

The network MAPs 170 and 270 set in the ARCNET entity 150 and 250 of a random station 100 or 200 are configured as in FIG. 3, and in each station, the station's own network path information is stored as a MAP. That is, the network path MAPs 170 and 270 of a random station has an identification code assigned made up with a name of network process in the source station, and address of a source address (Source SAP), a destination station to receive the generated data packet, and a destination process address for operating the data packet transmitted.

The number of identification codes is variable according to the numbers of the stations and of the processes in the station.

The SAP is a service access point, and indicates a process address.

The ARCNET data packet is structured as illustrated in FIG. 4, similar to the conventional one except that the source process address SSAP and destination process address DSAP are added to the data unit.

The structured data packet is made up with a start over head SOH section, a source address section SID, a destination address section DID, a count section COUNT, a data section DATA and a circulation repeat check CRC section.

Moreover, the structured data packet uses the first 4 bytes of DATA for SSAP and DSAP, and the next section for a unique unit Data.

Among the four byte process address unit, it is preferable to assign the first two bytes to SSAP unit, and the last two bytes to DSAP unit. SSAP and DSAP are included in the single data unit DATA, thus constantly compatible with the conventional ARCNET system.

Each station, in transmitting/receiving data packet, detects DID, SSAP and DSAP information from the network path MAP and decides a path of the data packet.

Figure 5:
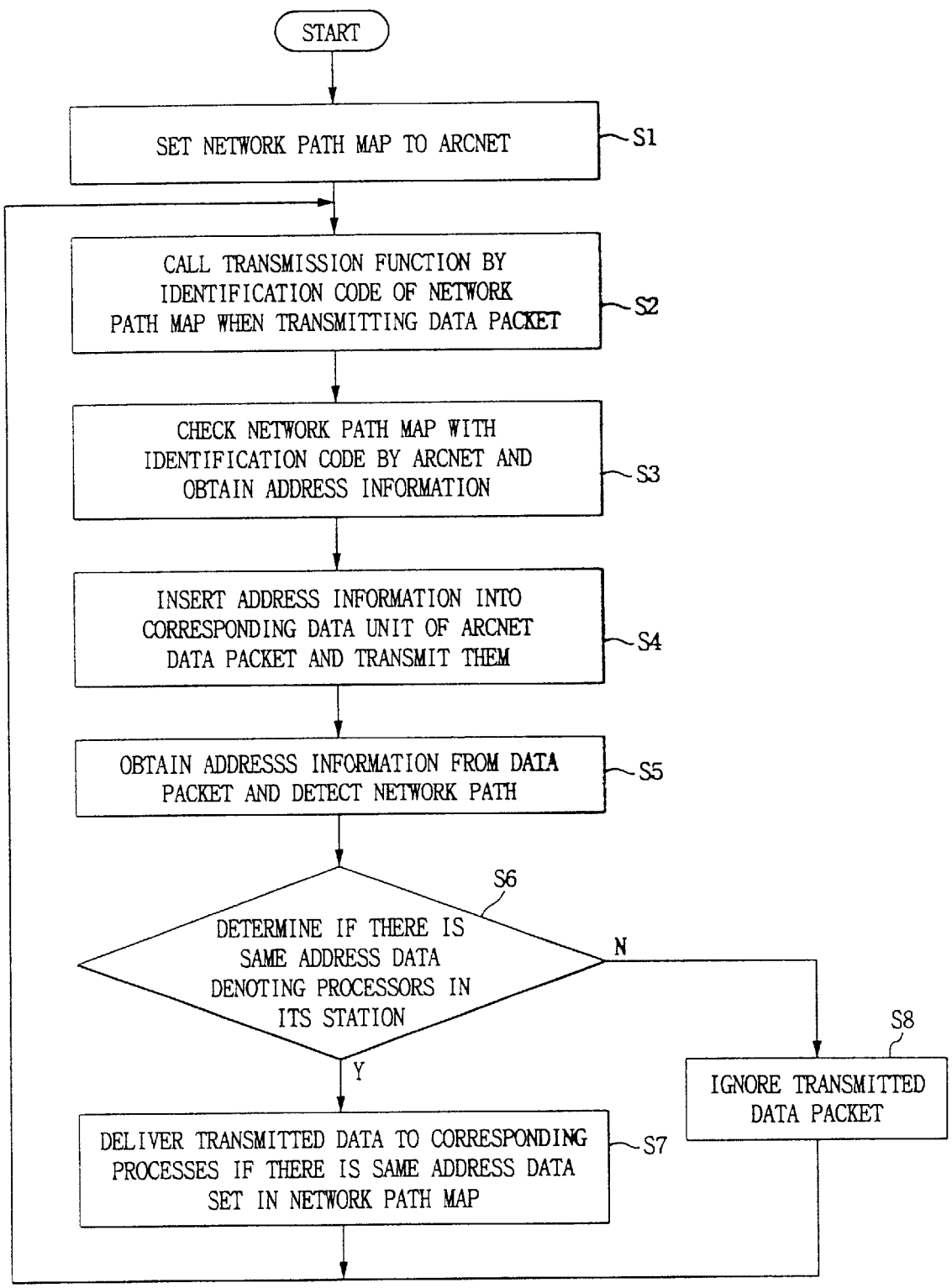
FIG. 5 is a flow chart illustrating a data transmitting/receiving method of the ARCNET of the invention.

FIG. 5 is a flow chart of the operational steps of FIG. 2, and will be described with reference to FIGS. 2 to 4 as follows.

First, a user structures network path MAPs 170 and 270 and sets them to the ARCNET entities 150 and 250 of station with a suitable means (not shown). Each network path, as illustrated in FIG. 3, has its own identification code and an address data corresponding to its own identification code in step S1.

Thereafter, when transmitting a data packet from the random station 100 to the other station 200, a transmission function is called with reference to the identification code of the network path MAP in step S2.

The ARCNET entities 150 and 250 check the network path MAP 170 with the identification code, obtain SSAP, DSAP and DID in step S3 and insert the SSAP and DSAP into the corresponding data unit of the ARCNET data packet, thus transmitting them in step S4.

The destination station 200 receives the data packet transmitted, obtains the address information from the data packet and detects the network path MAP 270 set in the ARCNET entity 250 in step S5.

It is determined in step S6 if there is the same address data denoting the processors 210a to 210n in its station 200 in the previous step S5.

The data transmitted to the corresponding processes are delivered in step S7 if there is the same address data set in the network path MAP 270 of the ARCNET entity 250 in the previous step S6.

And, if there is not the same address data in the previous step S6, the data packet transmitted is ignored in step S8.

If the data is transmitted and received in the above-mentioned method, the single channel can be used as the multi channel and a plurality of processors in each data station are also able to perform other works simultaneously.

As described above, in the invention, the network path MAP is set in ARCNET entity and a multi-channel can be used among a plurality of stations, thus enhancing the data operation rate. In addition, as the prototype of the protocol data unit (PDU) of ARCNET is not distorted, the invention is compatible with other conventional products using only single network path.

It will be apparent to those skilled in the art that various modifications and variations can be made in the method of multi-processing data in ARC network of the present invention without departing from the spirit or scope of the invention. Thus, it is intended that the present invention cover the modifications and variations of this invention provided they come within the scope of the appended claims and their equivalents.

What is claimed is:

1. A method of multi-processing data in attached resource computer network, comprising the steps of:

a first step of, in the attached resource computer network associated with each of a plurality of stations, setting a network address data MAP defining a path for transmitting data to the plurality of stations and each processor employed in each station;

a second step of, when transmitting data packet from a random station to a destination station, calling a transmission function by using an identification code corresponding to each address data in the network MAP, detecting the network MAP by the identification code to obtain the source process address and the destination station and the destination process address data, and inserting and transmitting into the data unit of the data packet;

a third step of receiving the data packet transmitted from the second step, obtaining the address data from the data packet, detecting the network MAP set in the attached resource computer network, and thereby determining if there is the same address data for denoting the process of its own station; and a fourth step of transmitting data to the corresponding process if there is the same address data set in the network MAP of the attached resource computer network in the previous third step.

2. The method as claimed in claim 1, wherein in the second step, the source process address and destination process address data are assigned to the first bytes and inserted.

3. The method as claimed in claim 1, wherein in the second step, the source process address and destination process address are assigned by two bytes and inserted into data unit.

* * * * *